United States Patent
Hehl

[11] 3,976,416
[45] Aug. 24, 1976

[54] ADJUSTABLE DIE CLOSING UNIT FOR INJECTION MOLDING MACHINE

[76] Inventor: Karl Hehl, Arthur-Hehl-Strasse 32, 7291 Lossburg, Germany

[22] Filed: July 19, 1974

[21] Appl. No.: 490,087

[30] Foreign Application Priority Data
July 20, 1973 Germany............................ 2336991

[52] U.S. Cl. .......................... 425/242 R; 425/451.2; 425/451.6; 425/DIG. 223
[51] Int. Cl.² .................... B29F 1/06; B30B 1/16; B30B 15/04
[58] Field of Search .. 425/450, 242, 247, DIG. 222, 425/DIG. 223, DIG. 224

[56] References Cited
UNITED STATES PATENTS

| | | | |
|---|---|---|---|
| 2,498,264 | 2/1950 | Goldhard | 425/DIG. 223 |
| 3,015,131 | 1/1962 | Hehl | 425/451.6 |
| 3,423,502 | 1/1969 | Stimpson | 425/DIG. 223 |
| 3,433,290 | 3/1969 | Eggenberger et al. | 425/242 X |
| 3,577,596 | 5/1971 | Bullard et al. | 425/242 X |
| 3,597,798 | 8/1971 | McDonald | 425/DIG. 223 |
| 3,669,599 | 6/1972 | Snider et al. | 425/242 |
| 3,736,092 | 5/1973 | Konig et al. | 425/DIG. 222 |

FOREIGN PATENTS OR APPLICATIONS

1,364,693  5/1964  France................................ 425/242

*Primary Examiner*—J. Howard Flint, Jr.
*Attorney, Agent, or Firm*—Joseph A. Geiger

[57] ABSTRACT

A knee linkage type die closing unit for an injection molding machine where the thrust stock engaged by the knee linkage is longitudinally adjustable along a threaded length of the guide spars, fine-adjustment being performed by an internally threaded worm gear on each guide spar and a common shaft with worms mounted thereon, the worm gear being clampable externally between a recessed face and a clamping plate and internally against the guide spar thread, by means of a rotatably connected, also internally threaded, clamping sleeve.

10 Claims, 2 Drawing Figures

ADJUSTABLE DIE CLOSING UNIT FOR INJECTION MOLDING MACHINE

BACKGROUND OF THE INVENTION

1. Field of the Invention

The present invention relates to injection molding machines, and in particular to adjustable die closing units for injection molding machines having a die closing unit of the knee linkage type with an axially adjustable thrust stock.

2. Description of the Prior Art

In heavy-duty injection molding machines, it is known to use die closing units of the knee linkage type which have their movable die plate supported on at least two guide spars extending between the stationary die plate and a stationary thrust stock outside the movable die plate, and where the knee linkage end points of the hydraulic drive are connected to the thrust stock and the movable die plate, respectively. Whenever a new molding die is mounted between the die plates which has a different closed height than the previously used molding die, the trust stock has to be adjusted accordingly.

It is known to obtain this adjustment by means of a worm gear drive arranged in the thrust stock, the worm being arranged on a crank-driven shaft, and the worm gear being internally threaded and seated on an externally threaded length portion of the guide spar. In the prior art device, each adjustment position is clampingly secured by means of two clamping nuts seated on the same threaded portion of the guide spar, engaging the thrust stock from the side of the molding die, the second nut serving as a counter-nut.

This prior art structure has the disadvantage that access to these clamping nuts for re-adjustment of the thrust stock position requires positioning of the die closing unit in its stretched knee linkage configuration, and that access to the clamping nuts is difficult, because a protective cover encloses the die closing unit. Prior to each adjustment of the thrust stock, it is therefore necessary to first remove this protective cover from the machine, in order to gain access to the clamping nuts.

SUMMARY OF THE INVENTION

The objective of the present invention is an improved adjustable thrust stock for the die closing unit of an injection molding machine, which permits ready access to the adjustment crank and clamping means, and which is designed for production cost savings through simplicification of the constituent parts of the thrust stock.

To attain this objective, the present invention suggests a thrust stock structure in which the longitudinal adjustment of the thrust stock is obtained by means of a common, crank-driven worm shaft engaging threaded worm gears on each guide spar, the worm gears being rotationally coupled to similarly threaded, adjacently positioned threaded clamping sleeves, each worm gear and clamping sleeve being axially confined and clampable between the inner face of an axial recess in the thrust stock and a cooperating clamping plate.

Since the clamping plate is arranged at the rear of the thrust stock, i.e. opposite the molding die, it is readily accessible, without the need for removing the protective cover of the die closing unit, and without the need for first moving the knee linkage into its stretched position.

An additional advantage of the preferred embodiment of the invention is related to the simplification of the constituent parts of the thrust stock assembly, the axial recess of the thrust stock itself, inside which the worm gear drive is arranged, being free of (previously necessary) undercut contour portions, and having only one machined planar face surrounding the bore through which the guide spar traverses the thrust stock. A simple facing operation combined with the boring of the guide spar bore now replaces the previously necessary milling operation for a double-faced recess inside which the prior art worm gear was accommodated.

The preferred embodiment of the invention further features a clamping plate with clamping screws which are so arranged that one set of screws need not be loosened or tightened for clamping or unclamping of the adjustment drive.

The preferred embodiment further suggests that, in order to maintain the clamping plate perpendicularly aligned with respect to the guide spar, for an even clamping of the clamping sleeve and worm gear, the depth of the axial recess in the thrust stock be adjusted in relation to the axial dimension of the combined clamping sleeve and worm gear so that, when the latter are clamped axially, the clamping plate abuts against the outer face of the thrust stock. Adjustment, if necessary, is conveniently obtainable by shimming the clamping plate. Since the recess accommodating the worm gear drive is asymmetrical in relation to the guide spars, the more distant clamping screws can thus be permanently secured in their clamped position, using glue, for example.

The threaded clamping sleeve is preferably axially spaced a small distance from the identically threaded worm gear and rotationally coupled thereto by means of one or more axial pins engaging aligned bores of the two parts. Other engagement means may, of course, be substituted for these pins.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows.

DESCRIPTION OF THE PREFERRED EMBODIMENT

Figure 1:
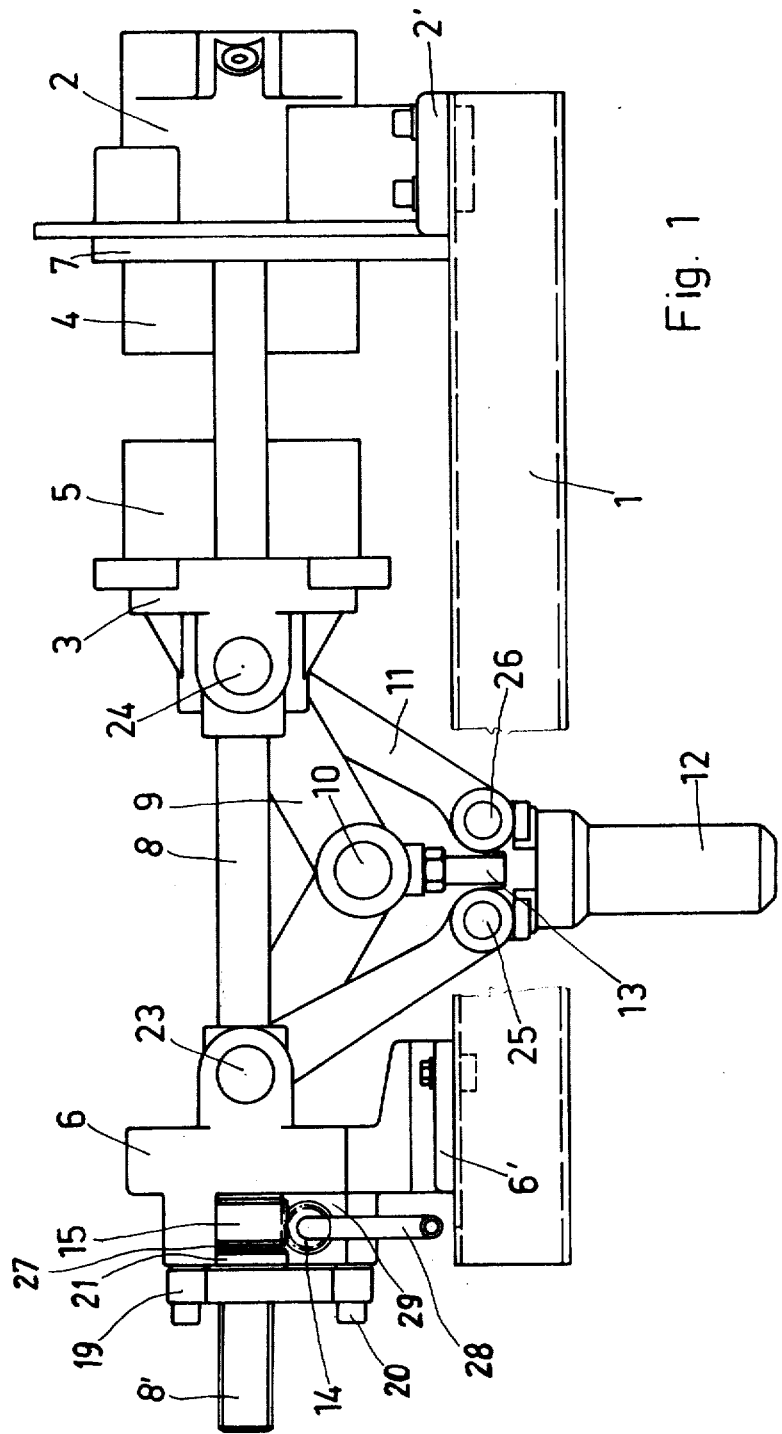
FIG. 1 shows in an elevational view a die closing unit with an adjustable thrust stock embodying the invention.

In FIG. 1 is shown a knee linkage type die closing unit of which the novel adjustable thrust stock is a part. The entire die closing unit is supported on a frame-like support arm 1 which extends from an injection molding machine (not shown), either horizontally or vertically. On its right-hand side, the support arm 1 carries a stationary die carrier plate 2, mounted to the arm 1 by means of a base flange 2'. To the inner face of the die carrier plate 2 is attached one of the two halves of a split molding die, the die half 4 being retained by means of a die retaining bracket 7.

Figure 2:
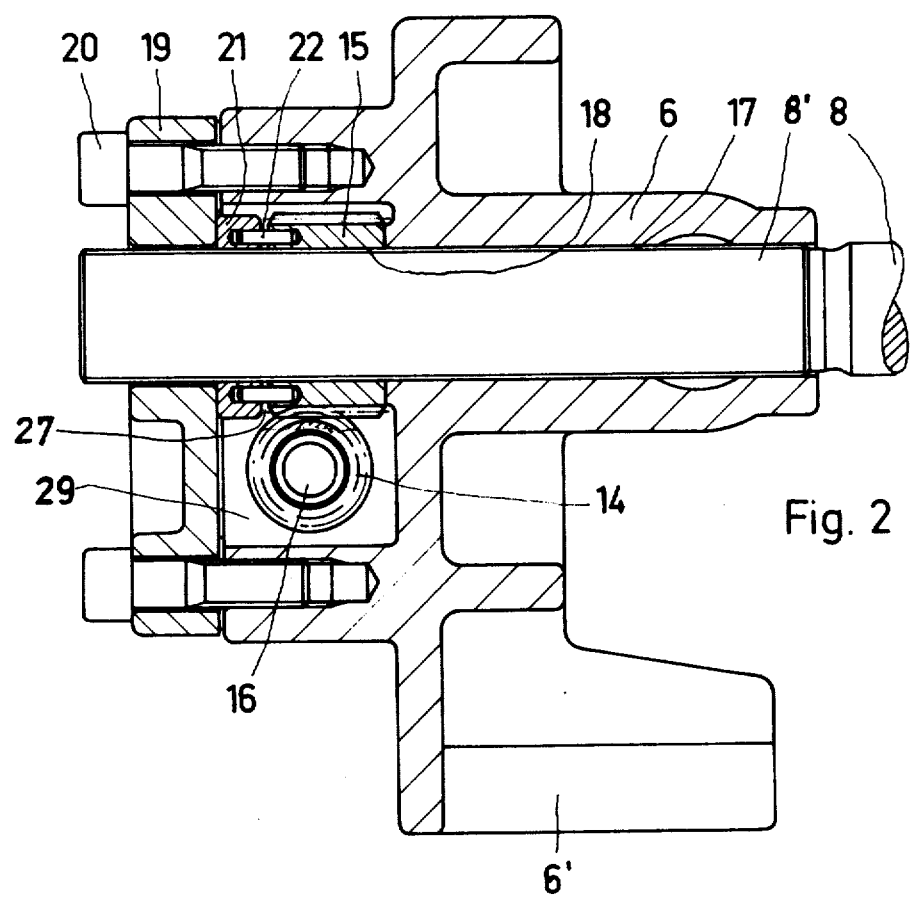
FIG. 2 shows the thrust stock of the die closing unit of FIG. 1 in an enlarged, longitudinally sectioned representation.

The second die half 5 is attached to a movable die carrier plate 3 facing the stationary die carrier plate 2 and its die half 4. The movable die carrier plate 3 is guided for longitudinal opening and closing motions on a pair of guide spars 8. These guide spars, positioned one behind the other in the drawing, are fixedly attached on their right-hand extremity in the stationary die carrier plate 2, and extend through the entire length of the die closing unit, the opposite end portions being carried by the thrust stock 6 which is supported on the upper face of the support arm 1 by means of a base flange 6', much like the stationary die carrier plate 2. Since the guide spars 8 are solidary with the latter, longitudinal adjustment of the distance between the closed die carrier plates, for a new die of different closed height, requires that the longitudinal connection between the guide spars 8 and the thrust stock 6 accommodates adjustability. For this purpose, each guide spar 8 has a threaded length portion 8' extending through a bore in the thrust stock (FIG. 2). This thread is engaged by an adjustment gear drive to be described further below. Of course, prior to any adjustment, the clamping connection between the thrust stock base flange 6' and the support arm 1 must be removed or released.

The movable die carrier plate 3 receives its motion from a hydraulic drive cylinder 12 engaging the die carrier plate 3 by means of a knee linkage 9, 10, the transverse motion of the piston rod 13 of cylinder 12 providing a closing motion, as the knee joint 10 approaches its upper end position in which the knee links 9 are in their stretched, aligned position between the thrust stock 6 and the movable die carrier plate 3. The hydraulic cylinder 12 itself is suspended on the thrust stock 6 and on the movable die carrier plate 3 by means of carrying ties 11 engaging on their upper ends the same pivot pins 23 and 24 as are engaged by the knee links 9, while their lower extremities are pivotably connected to the body of cylinder 12 by the pivot pins 25 and 26.

As an inspection of FIG. 1 of the drawing readily reveals, the longitudinal adjustment of the closed distance between the die carrier plates 2 and 3 need not be limited to a longitudinal displacement of the thrust stock 6 on the support arm 1, but may involve also, or only, a longitudinal adjustment of the stationary die carrier plate 2 with respect to the support arm 1. The end result in both cases is the same.

As can best be seen in FIG. 2, the thrust stock 6 has on its outer, i.e. left-hand side an open axial recess 29 inside which the earlier-mentioned adjustment gear drive is accommodated. This axial recess is free of undercut contour portions. In the lower portion of recess 29 is arranged a transverse shaft 16 on which are fixedly mounted two worms 14, each in alignment with one of the two guide spars 8. On these guide spars, in engagement with the worms 14, are arranged internally threaded worm gears 15 engaging the threaded length portion 8' of the guide spar 8. Thus, a rotation of the threaded worm gear 15, through rotation of the worm shaft 16 by means of a crank 28 (FIG. 1) attached thereto, causes the guide spar 8 to be screwed into or out of the thrust stock 6.

Identical worm gear drives are provided for each guide spar, and it should therefore be understood that, in the case of a die closing unit with more than two guide spars, for example, an equal number of worm gear drives, connected to a single worm shaft, are provided. The further description of this arrangement, as relating to a single guide spar and adjustment gear, should therefore be seen as relating to all the guide spars of a particular die closing unit.

Since the threaded worm gear 15 acts as a nut with respect to the guide spar 8, its rotation causes the thrust stock 6 to be moved axially along spar 8. The axial engagement between the threaded worm gear 15 and the thrust stock 6 is provided by a planar thrust face on the bottom of recess 29, on the one side, and by a clamping plate 19 covering recess 29, on the other side. However, the threaded worm gear 15 does not directly engage the clamping plate 19, but between them is arranged a threaded clamping sleeve 21 which has the same female thread as gear 15 and which is rotationally coupled with the latter at a small axial clearance 27 therefrom. Thus, any axial pressure exerted on the two threaded members causes them to be firmly clamped on the threads of the guide spar 8. The rotational coupling between the threaded worm gear 15 and the threaded clamping sleeve 21 is preferably obtained by means of two axially oriented coupling pins 22 engaging bores in the two parts.

It should be understood that other rotational coupling means could be provided, or that the threaded worm gear and threaded clamping sleeve could be fabricated from a single piece which has one or more radial slits provided therein so as to permit the axial adjustment between the two parts which is necessary for the clamping action.

Axial clamping of the worm gear and clamping sleeve is obtained by means of the clamping plate 19, which also serves as a cover for the recess 29 inside which the adjustment gear drives are accommodated. Clamping screws 20 hold the clamping plate 19 against the thrust stock 6. The clamping configuration is preferably so designed that the overall axial length of the threaded parts 15 and 21, when clamped, corresponds to the axial depth of recess 29, meaning that the clamping plate 19, in the clamped position of parts 15 and 21, is also clamped against the outer face of the thrust stock 6. This provides an assurance that the clamping plate 19 is perpendicularly aligned with the threaded portion of the guide spar 8, and that no skewing occurs in the clamping configuration. The adjustment for this clamping configuration is conveniently obtainable by means of a suitable shim between the thrust stock and the clamping plate, or by means of a compressible gasket. It then becomes possible to secure the lower clamping screws 20, which are further away from the axis of the clamped members, so that these screws need not be loosened for unclamping the adjustment gear. These clamping screws may therefore be permanently secured against release by means of a strong glue, or the like.

The adjustment operation on the thrust stock 6 is thus greatly simplified, it being necessary to only loosen the attachment of stock 6 on the support arm 1, to loosen the upper clamping screws 20 and to rotate the crank 28 until the proper position is adjusted, whereupon the previously loosened clamping members are again tightened. It will be noted that, in the clamped position, the threaded worm gear 15 will carry the main thrust between the thrust stock 6 and the guide spars 8, especially in the closed position of the molding die, while the clamping sleeve 21 transmits the thrust generated by the opening motion of the die. The crank 28 on the worm shaft 16 may of course be replaced by other driving means, such as a ratchet wrench, or the like.

The described clamping configuration between the clamping plate 19 and the clamped gear 15 and sleeve 21 also has the advantage that it assures evenly distributed clamping on both guide spars 8. A similar condition exists in the case of more than two guide spars. For instance, a die closing unit with four guide spars 8 may be so arranged that two diametrically opposite guide spars have threaded length portions 8' and adjustment gears arranged thereon, while the other two guide spars have no axial connection with the thrust stock 6. Alternatively, a four-spar die closing unit may have adjustment gears on each spar, with a common shaft driving all four threaded worm gears and their threaded clamping sleeves in synchronism. Again, all clamping sleeves are clamped simultaneously and evenly by means of a common clamping plate. In this case, the adaptation of the combined axial lengths of the threaded worm gears 15 and threaded clamping sleeves 21, so that they correspond to the exact distance of the clamping plate 19, may be advantageously obtained in the clamped parts themselves, by arranging coupling means between them which allow for rotational re-setting. This can be done by providing a series of bores for the axial coupling pins 22 in one or both of the coupled parts, the pin bores being, for example, so spaced that angular adjustment in small increments is possible.

It should be understood, of course, that the foregoing disclosure describes only a preferred embodiment of the invention and that it is intended to cover all changes and modifications of this example of the invention which fall within the scope of the appended claims.

I claim:

1. In an injection molding machine having a knee linkage type die closing unit engaging a movable die carrier and a thrust stock with the end points of its knee linkage, thereby opening and closing the movable die carrier against a stationary die carrier which faces the former on the opposite side of the thrust stock, a device for fine-adjusting the longitudinal distance between the thrust stock and the stationary die carrier, comprising in combination:
   a generally flat supporting member carrying the thrust stock and the stationary die carrier;
   at least two parallel guide spars engaging and supporting the movable die carrier and extending longitudinally between the thrust stock and the stationary die carrier, whereby the latter serve as opposite guide spar supports;
   means for fixedly attaching the guide spars to one of said two guide spar supports;
   means for threading the other guide spar support longitudinally toward and away from said first-mentioned guide spar support; and wherein the threading means includes:
   a threaded length portion on each guide spar reaching through a guide bore in the associated guide spar support;
   an internally threaded adjustment member rotatably engaging each guide spar threaded length;
   means for rotating said adjustment members in synchronism;
   a recess in the guide spar support having opposing axial faces confining the adjustment members therebetween;
   means for axially clamping each adjustment member between the opposing axial faces of the recess, so as to block it against rotation; and
   means for also clamping the threads of each adjustment member against the guide spar threads, under the action of said axial adjustment member clamping means, so as to axially and rotationally block the mating threads against each other, thereby setting the position of the second guide spar support relative to the guide spar free of any operational backlash.

2. An adjustment device as defined in claim 1, wherein:
   the guide spar support to which the guide spars are fixedly attached is the stationary die carrier; and
   the guide spar support that is threadable longitudinally on the guide spars is the thrust stock.

3. An adjustment device as defined in claim 1, wherein:
   each threaded adjustment member includes an internally threaded worm gear engaging the guide spar thread; and
   the adjustment member rotating means includes a transverse adjustment shaft with a plurality of worms mounted thereon, each worm engaging a threaded worm gear.

4. An adjustment device as defined in claim 3, wherein
   the adjustment shaft includes a hand crank attached to one of its extremities.

5. An adjustment device as defined in claim 3, wherein
   each threaded adjustment member further includes an internally threaded clamping member engaging the guide spar thread, the clamping member being connected to the threaded worm gear so as to rotate therewith, while being axially yielding in relation to the worm gear, thereby constituting said means for clampingly engaging the guide spar thread.

6. An adjustment device as defined in claim 5, wherein
   the threaded clamping members are clamping sleeves, separable from the worm gears and rotationally connected thereto by coupling members which permit axial displacement between the worm gear and the clamping sleeve.

7. An adjustment device as defined in claim 6, wherein
   the coupling members between the threaded worm gears and threaded clamping sleeves are coupling pins engaging axial bores in said threaded parts.

8. An adjustment device as defined in claim 1, wherein:
   each threaded adjustment member includes two internally threaded parts, both engaging the guide spar thread, the two parts being rotationally connected together, while being axially yielding against each other so as to serve as said means for clampingly engaging the guide spar thread;
   the recess in the guide spar support is an axial recess which is open in the direction away from the opposite guide spar support, the recess including a planar thrust face surrounding each of said guide bores receiving the guide spar threaded lengths and a parallel clamping face at a distance from the thrust face corresponding to the overall axial length of the two threaded adjustment member parts on the guide spar, minus their axial yield when clamped; and the adjustment member clamping means includes a flat clamping plate covering the axial recess in the guide spar support, and which, when clamped against said clamping face, thus engages the two adjustment members in a thread-clamping relationship between the thrust face and the clamping plate.

9. An adjustment device as defined in claim 8, wherein:

the two threaded parts of each adjustment member are separate parts and include rotational coupling members arranged between them; and the rotational coupling members are arranged for angular adjustment of one threaded part in relation to the other so as to adjust the overall axial length of the two parts engaging the guide spar thread.

10. An adjustment device as defined in claim 8, wherein:

the clamping plate is clampable to the guide spar support by means of two sets of clamping screws, one being arranged at a greater distance from the guide spars than the other; and said more distant clamping screws and permanently set in their clamped position in such a way that the clamping plate, when the other clamping screws are loosened, yields from the clamping face just enough to eliminate the thread-clamping condition on the adjustment members.

* * * * *